July 22, 1969 L. FURT ET AL 3,456,321
METHOD FOR MANUFACTURING SPRINGS
Filed Nov. 17, 1966 2 Sheets-Sheet 1

INVENTORS
LUDWIG FÜRT et al

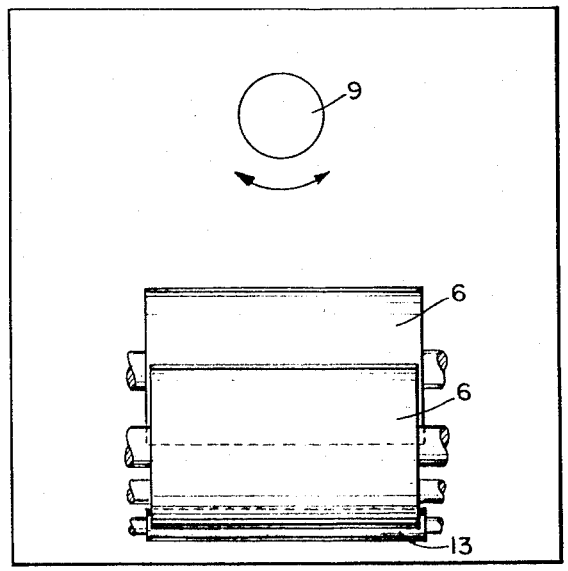
FIG. 3
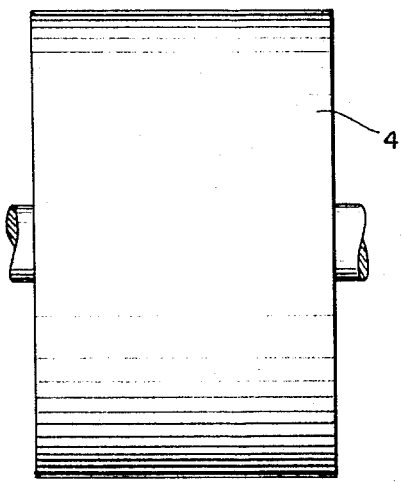
FIG. 4
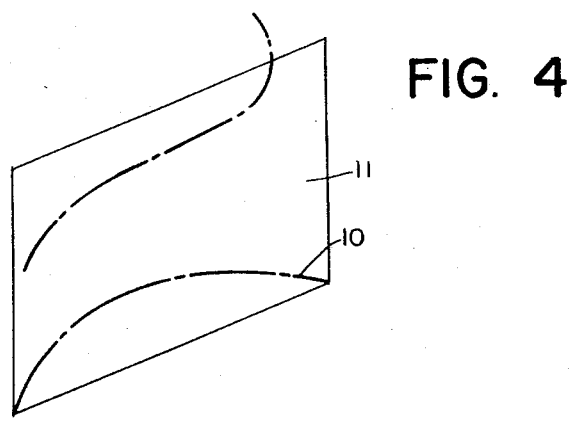
INVENTORS
LUDWIG FURT et al

United States Patent Office 3,456,321
Patented July 22, 1969

3,456,321
METHOD FOR MANUFACTURING SPRINGS
Ludwig Furf, Dresden, and Helmut Hahne and Rudolf Spitzner, Leipzig, Germany, assignors to Vereinigung Volkseigener Betriebe Automobilbau, Karl-Marx-Stadt, Germany
Filed Nov. 17, 1966, Ser. No. 595,234
Int. Cl. B21f 35/00; B23p 13/00; B21b 1/00
U.S. Cl. 29—173                                      4 Claims

ABSTRACT OF THE DISCLOSURE

A method of manufacturing leaf springs. The leaf spring has opposed sides one of which is a tension side and the other of which is a compression side. In accordance with the method the spring is heat treated and then ground subsequent to the heating treating at an exterior surface of the spring. The exterior surface of the leaf spring is plastically deformed while applying compressive forces thereto in order to strengthen the exterior surface, and these compressive forces are applied to the compression side of the spring to an extent greater than to the tension side thereof, so as to achieve in this way a negative pre-tension at the compression side of the spring.

---

The present invention relates to a method for manufacturing springs.

In particular, the present invention relates to a method for manufacturing leaf springs.

There are known methods for manufacturing leaf springs according to which the individual leaf springs are blasted with sand or steel particles for a period of time which will give to the exterior surface of the leaf spring a sufficiently great strength resulting from the impact of the sand or steel particles on the exterior surface of the leaf spring.

Furthermore, it is known to load a leaf spring which has been heat treated almost up to its elastic limit and while it is loaded to blast a side of the leaf spring which is under tension with steel particles. After this operation the setting operation of the leaf spring takes place, and this method is repeated until a sufficiently great strength for the exterior surface of the leaf spring is achieved.

It is attempted with these known methods to provide leaf spring assemblies which will occupy a minimum amount of space and which will have a minimum amount of weight.

The leaf springs which are obtained in the above manner have exterior depression-sensitive surfaces because the relatively sharp-edged steel blasting particles provide in the exterior surfaces of the leaf springs depressions which give rise to cracks and fissures in the leaf spring, so that the resistance of such leaf springs to bending is limited and such leaf springs have only a limited operating life as a result of these circumstances. In addition, the known methods have the disadvantage of requiring the use of an extremely large amount of steel blasting particles.

It is a primary object of the present invention to eliminate the above drawbacks.

Thus, it is an object of the present invention to provide a method which produces leaf springs which do not have depression-sensitive exterior surfaces.

Also, it is an object of the present invention to provide a method which will produce leaf springs in an economical manner which does not require the use of a large amount of steel blasting particles.

Thus, it is a primary object of the present invention to provide a method which will produce springs which have a high resistance to bending and which are capable of carrying large loads.

The results of the invention are achieved by subjecting a leaf spring, after it has been heat-treated, to compressive forces sufficient to plastically deform the exterior surface of the leaf spring so as to increase the strength of the exterior surface of the leaf spring. Before the plastic deformation of the exterior surface of the leaf spring takes place, the leaf spring is ground, preferably at its tension side, and the compressive force which is applied to the compression side of the leaf spring is greater than the compressive force which is applied to the tension side thereof, so that during the plastic deformation of the exterior surface of the leaf spring the convex compression side thereof will be subject to a greater compressive force than the concave tension side thereof. In this way there is provided at the convex compression side of the leaf spring a negative pre-tension which must be eliminated during loading of the spring before this side of the spring will be subjected to tensile forces. Because of the greater compressive force which is applied to the compression side of the leaf spring, fatigue of the leaf spring is to a very large extent avoided.

An apparatus, which may be used in carrying out the method of the present invention, includes a roller installation which has a pair of pressure rollers between which the leaf spring is compressed, and one of these rollers has a diameter substantially larger than the other while the leaf spring is guided along this one roller of larger diameter with the concave side of the leaf spring conforming in part to the exterior curvature of the roller of larger diameter, so that in this way the convex side of the leaf spring is engaged by the roller of smaller diameter. Thus, a greater compressive force is applied to the convex compressive side of the leaf spring, as compared to the concave tension side thereof. The roller of smaller diameter is supported for free swinging movement, by a bearing means, about an axis which is perpendicular to the axis of the roller of smaller diameter and which is situated in a plane which passes perpendicularly through the axis of the roller of smaller diameter midway between the ends of the latter. Because of this capability of the roller of smaller diameter to swing freely about the axis determined by the bearing means, lateral pressing of the leaf spring out of its predetermined path of movement, when the leaf spring has a variable thickness, is avoided. In order to feed the leaf spring between the pressure rollers, while applying to the leaf spring at its exterior surface a surface hardening pressure in the region of over the elastic limit of the spring steel, feed rollers are provided before and behind the pressure rollers, and these feed rollers stress the leaf spring in a manner determined by the pressure of the pressure rollers and the thickness of the leaf spring, with these feed rollers simultaneously providing pushing and pulling forces so as to feed the leaf spring between the pressure rollers. These feed rollers at the same time control the curvature of the leaf spring so as to control the angle of contact between the concave tension side of the leaf spring and the roller of larger diameter.

The invention illustrated by way of example in the accompanying drawings which form part of this application and in which.

Figure 2:
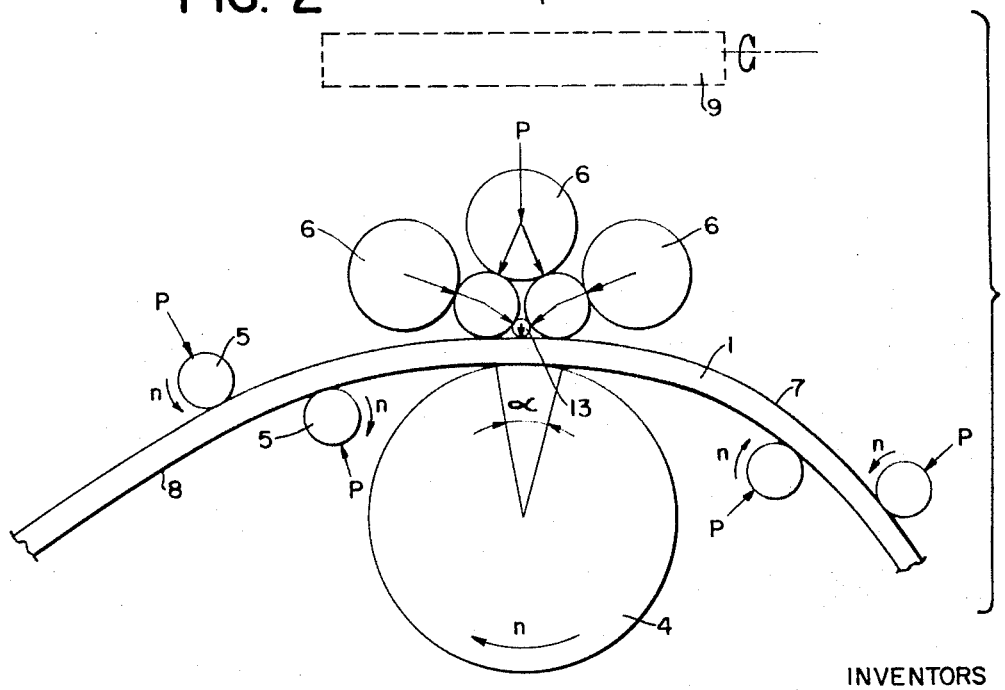
FIG. 2 is a schematic illustration of an apparatus for carrying out the method of the invention.

FIG. 3 shown the structure of FIG. 2 as seen from the right hand side of FIG. 2, FIG. 3 in particular illustrating the bearing means which supports the roller of smaller diameter for free swinging movement; and FIG. 4 is a schematic representation of characteristic curves of the leaf spring.

Figure 1A:
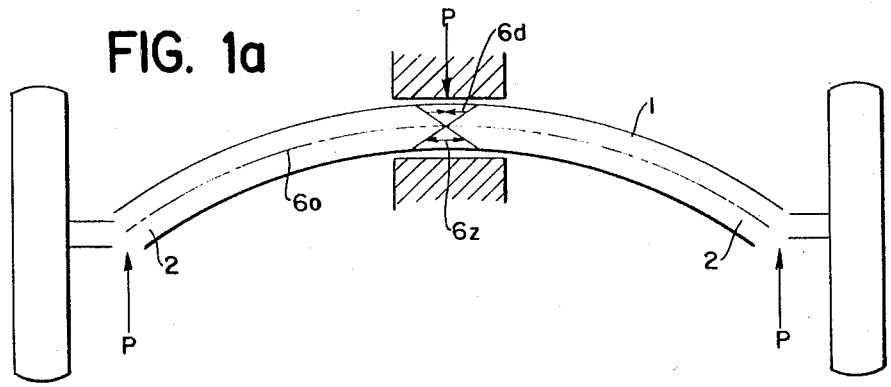
FIG. 1a is a schematic illustration of a transverse leaf spring shown in an assembled condition in an automobile, for example.

Referring to FIG. 1a, there is schematically illustrated therein a leaf spring 1 which forms one of an assembly of leaf springs which extend transversely with respect to an automobile, the wheels of which are schematically indicated at the left and right ends of FIG. 1a. As is apparent from FIG. 1a, the convex upper side of the leaf spring 1 is directed upwardly toward the chassis of the vehicle, and the force P acts on the leaf spring in the manner indicated schematically in FIG. 1, this force P acting on the leaf spring midway between the ends 2 thereof. Thus, it will be seen that the convex upper side of the leaf spring which is directed toward the chassis, is subjected to compression and forms the compression side of the leaf spring while the lower concave side thereof is the tension side of the leaf spring.

Figure 1B:
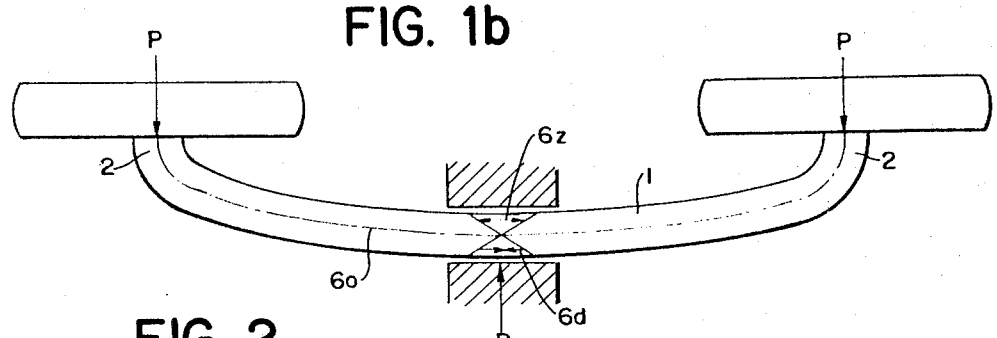
FIG. 1b is a schematic illustration of a longitudinally extending leaf spring also shown schematically in an assembled condition in an automobile, for example.

In FIG. 1b there is shown a leaf spring 1 which extends longitudinally of the vehicle, FIG. 1b also schematically illustrating how the convex side of the leaf spring is directed toward the axle of the vehicle and is subjected to a compressive force, so that in this case also the convex side of the leaf spring is the compression side thereof whereas the concave side is the tension side thereof.

Referring now to FIG. 2, elongated leaf spring 1 is shown moving from the left toward the right in FIG. 2 through a roller installation 3 which applies compressive forces to the opposite sides of the leaf spring. Thus, FIG. 2 shows that stage of the process of the invention where the compressive forces are applied to the exterior surfaces of the leaf spring so as to plastically deform these exterior surfaces and thus give them the required hardness or strength. The leaf spring, which has previously been heat treated and which has been simultaneously blasted in a hardening device, is introduced into the roller installation 3 and is advanced therethrough by the feed rollers 5. The concave surface of the leaf spring extends around a pressure roller 4 while the convex side of the leaf spring engages a pressure roller 13, and these pressure rollers 13 and 4 apply the compressive forces which plastically deform the exterior surface of the leaf spring. Because the concave side 8 of the leaf spring engages the larger pressure roller 4, the angle of confact between the concave side 8 and the roller 4, this angle $\alpha$ being indicated in FIG. 2, is considerably greater than the contact angle between the smaller roller 13 and the convex surface of the leaf spring. As a result, the compressive forces delivered by the rollers 13 and 4 are distributed over different areas with the roller 4 distributing the compressive forces over a considerably larger area, so that in this way a greater compressive force is applied to the convex surface 7 by the smaller roller 13.

The feed rollers 5 are longitudinally displaced along the leaf spring and turn in the directions indicated by the arrows $n$, the pressure roller 4 turning also in the direction indicated by the arrow $n$, so that not only do the feed rollers 5 feed the leaf spring through the pressure rollers 13 and 4, but in addition these feed rollers 5 apply turning moments to the leaf spring, bending the latter and controlling the curvature thereof as it moves between the rollers 13 and 4. In this way, in accordance with the characteristics of the leaf spring and the pressure applied thereto by the rollers 13 and 4, it is possible to position the feed rollers 5 so as to reduce the force required for feeding of the leaf spring through the pressure roller installation 3. The pressure rollers 5 to the left of the roller 4 in FIG. 2 push the leaf spring while the pressure rollers 5 to the right of the roller 4 of FIG. 2 pull on the leaf spring, and thus these rollers act to push and pull the leaf spring through the roller assembly.

It is to be noted that the roller assembly includes rollers 6 which transmit their forces, in the manner indicated in FIG. 2, to the small compression roller 13, and these rollers 6 have a diameter considerably greater than that of the roller 13 so that they serve to reliably support the latter while still being capable of applying through the roller 13 a tremendous force of compression on the leaf spring.

Because of the relatively great force with which the roller 13 acts, with corresponding pressure of the leaf spring, a plastic deformation and a simultaneous strengthening of the exterior surface of the leaf spring takes place, this pressure applied to the leaf spring being greater than the elastic limit of the spring steel, and as a result of this action any raised or depressed portions at the compression side 7 of the leaf spring are smoothed out of the latter.

FIG. 3 shows schematically how the bearing means 9 for the roller installation 3 supports the assembly of rollers situated above the leaf spring for free swinging movement about a horizontal axis which is situated in a vertical plane extending midway between the ends of the roller 13 perpendicularly to the axis of the latter. In this way the entire assembly of rollers over the leaf spring is capable of swinging freely about the horizontal axis provided by the bearing means 9, so that any variation in the transverse thickness of the leaf spring will not be disturbed and thus the center line 10 of the leaf spring 1, indicated in FIG. 4, will not be displaced from the vertical central plane 11 of the leaf spring.

What is claimed is:

1. In a method of manufacturing a leaf spring which has a pair of opposed sides, one of which is a tension side and the other of which is a compression side, the steps of heat treating the leaf spring, grinding the spring, subsequent to heat treating thereof, at an exterior surface of the spring, and plastically deforming the exterior surface of the leaf spring while applying compressive forces thereto in order to strengthen the exterior surface thereof, said compressive forces being applied to said compression side of said spring to an extent greater than to said tension side thereof, so as to provide said compression side of the spring with a negative pretension.

2. The method of claim 1 and wherein said leaf spring is curved and has a convex compression side and a concave tension side.

3. The method of claim 2 and wherein said grinding is applied to said tension side of said leaf spring.

4. The method of claim 1 and wherein said grinding is applied to said tension side of said spring.

References Cited

UNITED STATES PATENTS 3,238,072  3/1966  Greene et al. _____ 29—173 X
3,345,729  10/1967  Komarnitsky _____ 29—173

THOMAS H. EAGER, Primary Examiner

U.S. Cl. X.R.

72—199, 365